J. T. CORSAN.
PAPER WEIGHT AND ABSORBENT BLOTTER.
APPLICATION FILED DEC. 29, 1919.
1,408,344. Patented Feb. 28, 1922.
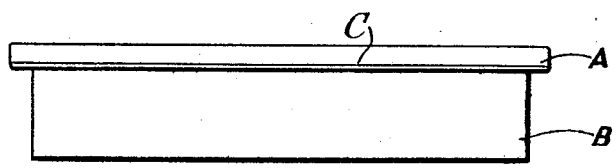
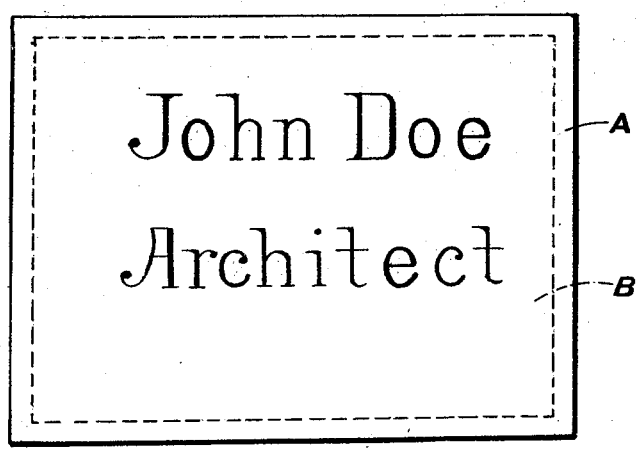

UNITED STATES PATENT OFFICE.

JOHN TAMSETT CORSAN, OF LONDON, ENGLAND.

PAPER WEIGHT AND ABSORBENT BLOTTER.

1,408,344.　　　　　Specification of Letters Patent.　　Patented Feb. 28, 1922.

Application filed December 29, 1919. Serial No. 348,207.

(GRANTED UNDER THE PROVISIONS OF THE ACT OF MARCH 3, 1921, 41 STAT. L., 1313.)

*To all whom it may concern:*

Be it known that I, JOHN TAMSETT CORSAN, subject of the King of Great Britain and Ireland, residing at 58A Gray's Inn Road, London, W. C., England, in the county of London, have invented certain new and useful Improvements in Paper Weights and Absorbent Blotters, (for which I have filed application in England, September 10, 1918, Patent No. 123,020,) of which the following is a specification.

My invention has reference to improvements in or relation to blotters and paper-weights, and has for its object to impart a more pleasing appearance and increase the utility of such.

For the blotting medium I employ a slab or tile composed of plaster of Paris and alum in the proportion of seven parts of plaster of Paris to one part of alum, or a composition of similar absorbent character and of sufficient substance and weight to act as a paper-weight. To the upper side of such slab or tile forming the blotting medium I attach a glass top plate secured thereto by a suitable adhesive substance or cement. Upon either side of such glass top plate which may be of clear coloured or mirror glass, an advertisement can be engraved with contrasting coloured letters, or a picture, photograph or advertisment hereinafter referred to as decorative matter may be mounted underneath.

In the drawings:

Fig. 1 is a view in side elevation of the improved paper weight and absorbent blotter.

Fig. 2 is a top plan view of the same.

Referring to the accompanying drawings which illustrate the preferred embodiment of my invention, the slab B of absorbent material is cemented or otherwise secured to the glass top plate A which projects beyond the slab.

The bottom surface of the glass top plate A may, if desired, be silvered, as indicated at C, Fig. 1, to provide a mirror. Furthermore, either side of said glass top plate may, if desired, be provided with advertising or other descriptive or pictorial matter, as indicated generally in Fig. 2 of the drawings.

I claim:—

1. The combination of a paper weight and blotter, comprising an absorbent slab, composed of plaster of Paris and alum, and a glass plate cemented thereto.

2. The combination of a paper weight and blotter, comprising an absorbent tile, composed of plaster of Paris seven parts and alum one part, and a glass plate cemented thereto.

In testimony whereof I affix my signature.

JOHN T. CORSAN.